United States Patent
Azenkot et al.

(10) Patent No.: US 10,498,565 B1
(45) Date of Patent: Dec. 3, 2019

(54) SAMPLING PHASE OPTIMIZATION FOR DIGITAL MODULATED SIGNALS

(71) Applicant: MACOM Technology Solutions Holding, Inc., Lowell, MA (US)

(72) Inventors: Yehuda Azenkot, San Jose, CA (US); Georgios Takos, Mountain View, CA (US); Bart Zeydel, El Dorado Hills, CA (US)

(73) Assignee: MACOM TECHNOLOGY SOLUTIONS HOLDING, INC, Lowell, MA (US)

( * ) Notice: Subject to any disclaimer, the term of this patent is extended or adjusted under 35 U.S.C. 154(b) by 0 days.

(21) Appl. No.: 16/122,478

(22) Filed: Sep. 5, 2018

(51) Int. Cl.
*H03H 7/30* (2006.01)
*H04L 7/00* (2006.01)
*H04L 25/03* (2006.01)
*H04L 27/01* (2006.01)

(52) U.S. Cl.
CPC .. *H04L 25/03885* (2013.01); *H04L 25/03019* (2013.01); *H04L 27/01* (2013.01); *H04L 2025/0349* (2013.01)

(58) Field of Classification Search
CPC ......... H04L 25/03885; H04L 25/03019; H04L 27/01
USPC .............. 375/232, 233, 316, 326, 371, 373
See application file for complete search history.

(56) References Cited

U.S. PATENT DOCUMENTS

| | | | | |
|---|---|---|---|---|
| 3,697,689 A | * | 10/1972 | Gibson | H04L 7/0058 375/232 |
| 5,228,060 A | * | 7/1993 | Uchiyama | H04L 25/03019 375/224 |
| 6,819,514 B1 | * | 11/2004 | Behrens | G11B 20/10037 360/46 |
| 7,023,941 B1 | * | 4/2006 | Rey | H04L 7/0058 375/232 |
| 2004/0071241 A1 | * | 4/2004 | Bouillet | H04L 1/20 375/347 |
| 2008/0123788 A1 | * | 5/2008 | Wongwirawat | H03G 3/3052 375/348 |
| 2017/0331619 A1 | * | 11/2017 | Azenkot | H04L 7/0087 |
| 2018/0123776 A1 | * | 5/2018 | Azenkot | H04L 25/03885 |

* cited by examiner

*Primary Examiner* — Tesfaldet Bocure

(57) ABSTRACT

System and method of timing recovery to achieve sampling phase optimization with aid of equalization adaptation. For equalizer filter, the offset between a current Center of Filter (COF) value and a nominal COF value is used as a measure for a clock phase correction resulted from an adaptive equalization process. A COF may be defined as a function of two selected tap weights or equal to a selected tap weight. The nominal COF value can be dynamically adapted based on the real-time sampling phase error. The tap weights of the equalizer filter are adjusted to decrease the offset, e.g., by interpolating/extrapolating selected tap weights based on the offset. By using sampling phase error as a feedback for COF_nom updating and so for equalization adaptation, the clock delay correction contributed by the adaptive equalization process is advantageously controlled to benefit sampling phase optimization.

22 Claims, 7 Drawing Sheets

SAMPLING PHASE OPTIMIZATION FOR DIGITAL MODULATED SIGNALS

TECHNICAL FIELD

The present disclosure relates generally to the field of signal processing in communications and, more specifically, to the field of timing recovery in signal processing.

BACKGROUND OF THE INVENTION

In communications systems, a transmitter sends data streams to a receiver in symbols, such as bits of data. As the receiver clock is typically not synchronized with the transmitter clock, the receiver needs to correctly recover the clock from the received signal itself. In addition, when data is transmitted over a communication channel, it is usually distorted in terms of phase and amplitude due to various types of noise, such as fading, oscillator drift, frequency and phase offset, and receiver thermal noise. At the receiver, the system is also subject to noise and timing jitter in a time domain. Therefore, the receiver needs a timing recovery process to obtain symbol synchronization, particularly to correct the clock delay and derive the optimal clock phase that is used to sample the received signal and achieve the best Signal-to-Noise Ratio (SNR).

Commonly, in an equalizer-based timing recovery loop of a receiver, an adaptive equalizer is employed to mitigate the effect of intersymbol interference (ISI) caused by the channel distortion. An adaptive equalizer enables the equalization process to be adapted to changes in channel characteristics over time. Typically, the adaptation is performed by dynamically adapting equalization parameters, such as the tap weights of an equalization filter.

Adaptive equalization itself can also result in correction for time delays of the input clock embedded in the received signal. Usually in the conventional receivers, the time delay correction resulting from the equalization adaptation interferes with the clock recovery process by the overall timing recovery loop, e.g., to be performed by a phase detector, a loop filter and a VCO in the same timing recovery loop. This interference may be problematic as it can cause recovered data symbols to shift from their optimized phase locations.

SUMMARY OF THE INVENTION

Accordingly, disclosed herein provide a mechanism of signal equalization that can control equalization adaptation to facilitate sampling phase optimization in timing recovery.

Embodiments of the present disclosure employ an equalizer capable of detecting a correction in clock delay resultant from equalization adaptation, and controlling the correction before sending an equalized signal to a phase detector and other downstream components in the timing recovery loop for clock recovery. Sampling phase error resulting from the timing recovery as well as from equalization adaptation is monitored and used to control compensation for the clock delay correction caused by the equalizer, such that the compensation can in effect facilitate and improve the timing recovery process. More specifically, in an equalization adaptation process, the equalizer coefficients are dynamically adapted to time-variant channel characteristics of a communication channel. At the same time, a current Center of Filter (COF) value is determined and used as a measure for clock delay correction resulting from the equalization adaptation.

In some embodiments, COF is defined as a function of one or more tap weights depending on the configuration of the phase detector.

During operation, the tap weights of the equalization filter vary with time in adaptation to variations in the communication channel characteristics. The current COF value of the filter is calculated and compared with a nominal COF value to generate a COF offset. A set of selected tap weights are adjusted based on the COF offset by interpolating/extrapolating another set of selected tap weights. The adjusted tap weights are fed back for adaptive equalization, which in turn leads to reduced COF offset. As a result, clock delay correction introduced by the adaptive equalization process is advantageously compensated, and its interaction with the timing recovery loop can be effectively and advantageously prevented.

Further, the nominal COF value is also dynamically adapted based on the sampling phase error resulting from the timing recovery loop. The sampling phase error can be indicated by, or derived from, an equalization signal error, such as an error signal between the output and the input of a slicer that is coupled to the output of the equalizer, or a bit-error-rate (BER) generated by a Forward Error Correction (FEC) decoder. The nominal COF value is adjusted until the equalization signal error is minimized. In turn, the adjusted nominal COF value is compared with the current COF, which produces a COF offset used to adjust the equalization tap weights as stated above.

By dynamically adjusting the COF nominal value and the COF value, the compensation for the clock delay correction introduced by the adaptive equalization not only can prevent negative interference between the equalization adaption process and the timing recovery process, but also can advantageously facilitate location of an optimal sampling phase in the timing recovery process.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps.

It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

BRIEF DESCRIPTION OF THE DRAWINGS

Embodiments of the present invention will be better understood from a reading of the following detailed description, taken in conjunction with the accompanying figures, in which like reference characters designate like elements.

SAMPLING PHASE OPTIMIZATION FOR DIGITAL MODULATED SIGNALS

Overall, embodiments of the present disclosure provide a timing recovery mechanism for recovering a clock signal that can achieve sampling phase optimization in clock phase recovery by use of equalization adaptation. Particularly, for an equalizer filter (or equalization filter), the offset between a current Center of Filter (COF) value and a nominal COF value is used as a measure for a clock phase correction resulted from an adaptive equalization process. In some embodiments, a COF may be defined as a function of two selected tap weights or equal to a selected tap weight. The nominal COF value can be dynamically adapted based on the real-time sampling phase error, which may be indicated by an error signal between the slicer input and output, or a bit-error-rate output from the Forward Error Correction (FEC) decoder. The tap weights of the equalizer filter are adjusted to decrease the offset, e.g., by interpolating/extrapolating selected tap weights based on the offset. By using sampling phase error as a feedback for COF_nom updating and so for equalization adaptation, the clock delay correction contributed by the adaptive equalization process is advantageously controlled to the advantage of sampling phase optimization in timing recovery.

Figure 1:
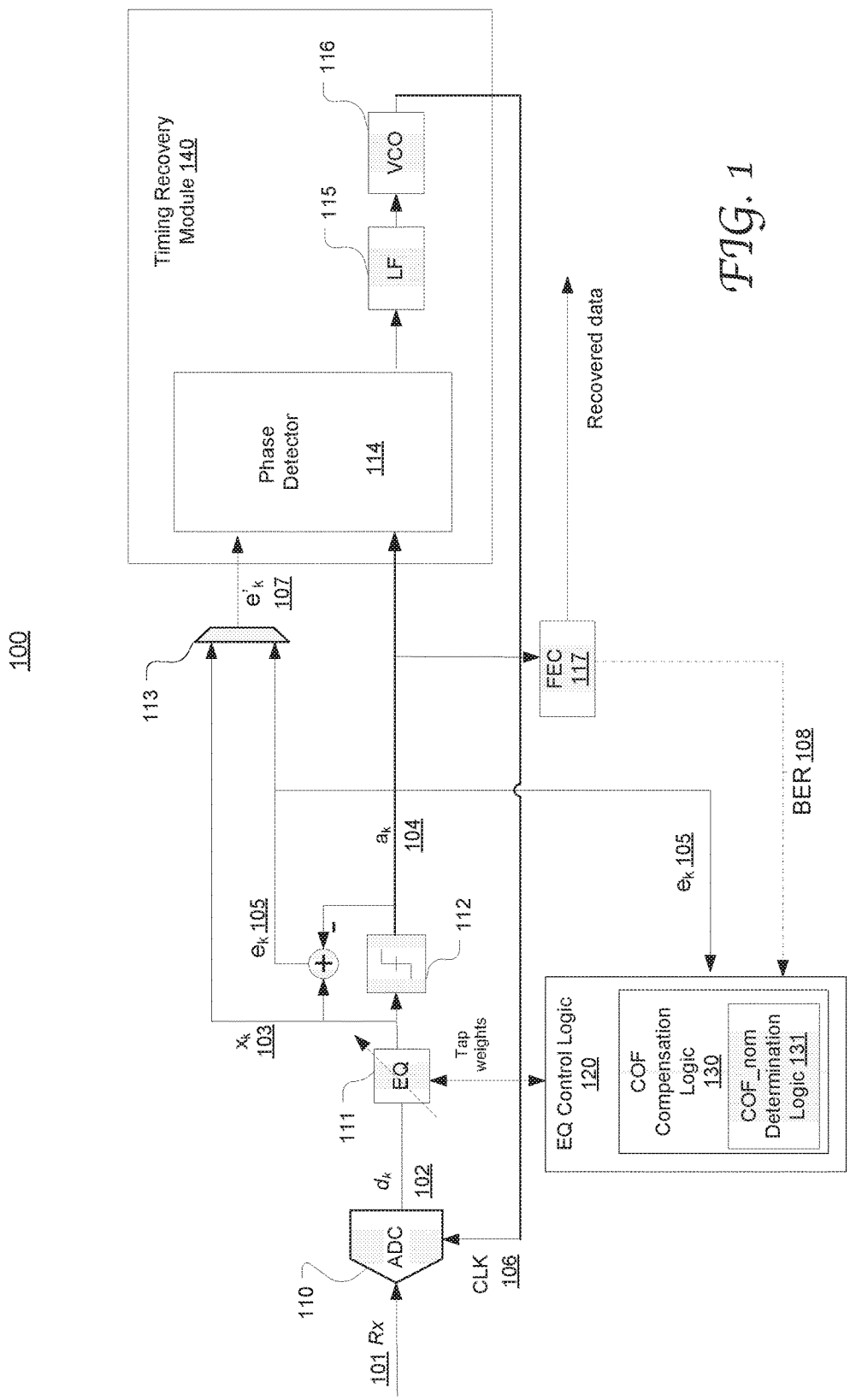
FIG. 1 illustrates the configuration of an exemplary equalizer-based timing recovery loop capable of utilizing clock delay correction caused by equalization adaptation to facilitate sampling phase optimization according to an embodiment of the present disclosure.

As noted above, an equalizer can cause clock delay correction when it is adaptive to the time-varying channel characteristics. The adaptation is typically implemented by adapting the tap weights of the equalizer filter. FIG. 1 illustrates the configuration of an exemplary equalizer-based timing recovery loop 100 capable of utilizing clock delay correction caused by equalization adaptation to facilitate sampling phase optimization according to an embodiment of the present disclosure.

As illustrated, the timing recovery loop 100 includes an Analog-to-Digital Converter (ADC) 110, an adaptive equalizer 111 coupled to an equalizer control logic 120, a slicer 112, a selector 113, a FEC decoder 117, a timing recovery module 140 which includes a phase detector 114, a loop filter 115, and a Voltage Controlled Oscillator (VCO) 116. A received analog signal $R_x$ 101 is converted by the ADC 110 to a digital signal $d_k$ 102 and then supplied to the equalizer 111 and the slicer 113. At the transmitter side, the signal may have been modulated using a Pulsed Amplitude Modulation (PAM) or a Quadrature Amplitude Modulation (QAM) scheme or any other mechanism that is well known in the art. The equalizer 111 is used to render a flat frequency response in the signal and output an equalized signal $x_k$ 103. After sampling at the slicer 112, the estimated symbols $a_k$ 104 are produced and supplied to the FEC decoder 117 and to the phase detector 114.

An error signal $e_k$ 105 is generated by comparing the equalized signal $x_k$ 103 and the estimated symbols $a_k$ 104. The error signal $e_k$ 105 and the equalized signal $x_k$ 103 are also fed to the timing recovery module 140 through the selector 113.

In the timing recovery module 140, the phase detector 114 generates a phase error between the selector output $e_k'$ 107 and the estimated symbols $a_k$ 104. The loop filter 115 filters the phase error, and the VCO 116 adjusts the effective sampling frequency and phase based on the average phase error. As a result, a recovered clock signal 106 is generated from the VCO 116 and, in turn, used to clock the ADC 110 for sampling as well as to clock downstream processing logic. The performance of symbol synchronization can be indicated by a Signal-to-Noise Ratio (SNR) or other suitable parameters related to the noise level in the data stream.

The phase detector 114, loop filter 115, and VCO 116 can be implemented in any suitable configuration that is well-known in the art. For example, the phase detector 114 can be based on a Mueller Muller algorithm as described in greater detail below. The loop filter 115 can be a typical digital filter for a second-order Phase Lock Loop (PLL). The VCO 116 may include a Phase-Locked Loop (PLL). Alternatively, the VCO 116 may be replaced with a phase interpolator using a programmable gain element, a digital interpolator, and/or an analog interpolator. For example, the digital interpolator includes a register and an adder. The analog phase interpolator receives a reference clock and outputs a clock signal with a phase that is a function of the input. In addition, an equalizer-based timing recovery loop capable of controlling clock delay correction caused by equalization adaptation may include various other components that are well-known in the art without departing from the scope of the present disclosure.

The adaptive equalizer (EQ) 111 may be a Feed-Forward Equalizer (FFE) implemented via a Finite Impulse Response (FIR) filter or a Decision-Feedback Equalizer (DFE) which includes an FFE and a feedback equalizer (FBE). However, the present disclosure is not limited thereto.

The equalizer filter (e.g., an FIR filter) is an adaptive filter which enables it to track any changes over time of a transmission channel. During adaptation, the tap weights of the equalizer filter may be updated through a Least-Mean-Square (LMS) adaptation process with programmable step sizes for the taps. Especially, it's typical to have a different step size for the main three taps, namely the reference tap (RefTap) and the taps before and after the RefTap.

The equalization adaptation can also result in correction of time delay in the channel. As noted above, without appropriate control, this tends to undesirably interfere with timing recovery process performed by the timing recovery loop including the timing recovery module 140 and the feedback line to the ADC 110. According to the present disclosure, the adaptive equalizer 111 is coupled to the EQ control logic 120 configured to control the delay correction resulting from the equalizing adaptation process to assist the timing recovery module to output a clock signal 106 with optimal sampling phases.

According to another aspect of the present disclosure, the EQ control logic 120 is configured to detect in real-time the amount of correction of time delay that results from the adaptation of equalization filter, and dynamically control the correction by modifying the tap weights of the filter. The present disclosure is not limited to any specific metric used to monitor the amount of correction of time delay introduced by the equalization adaptation.

Figure 3:
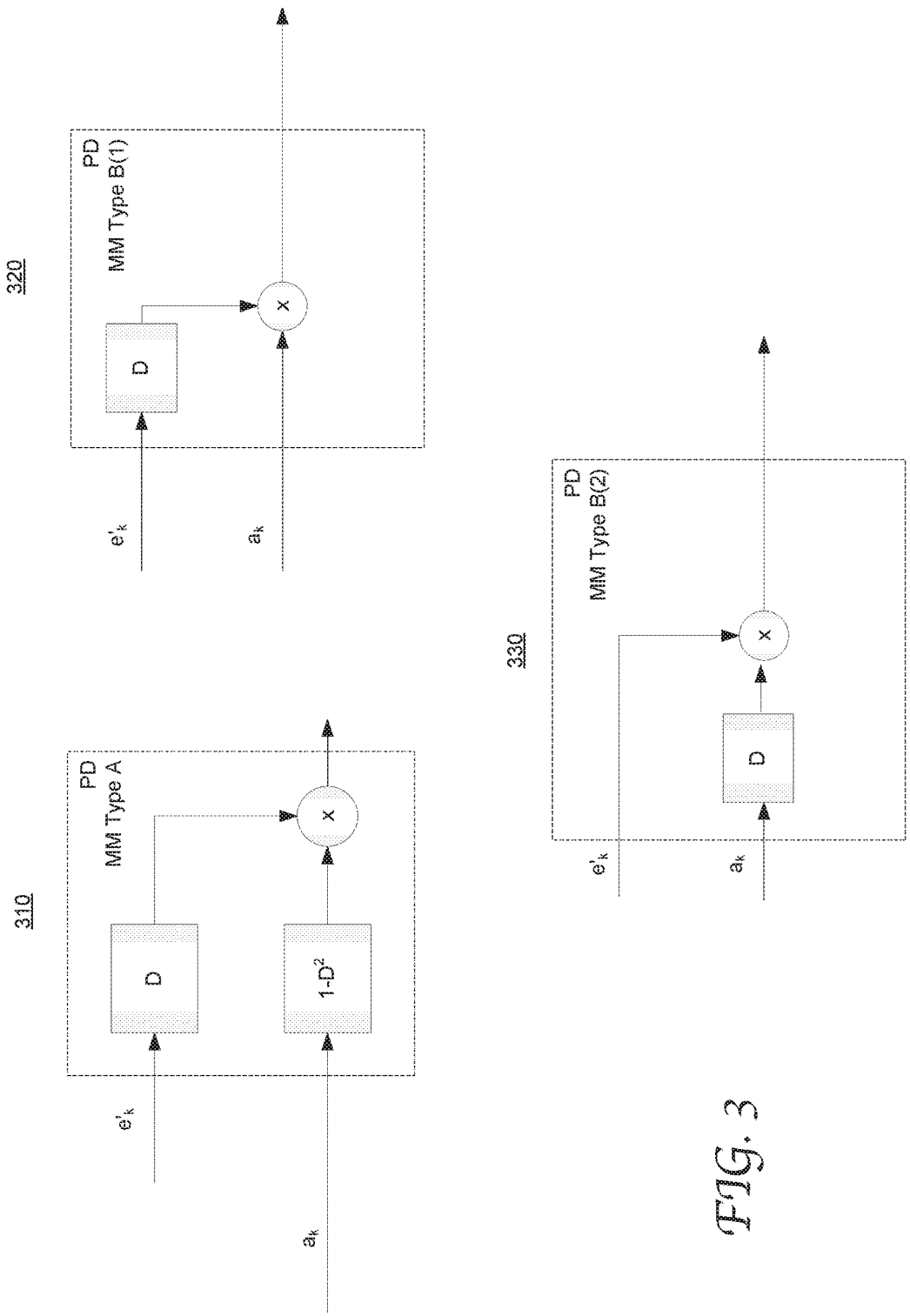
FIG. 3 illustrates the configurations of exemplary phase detectors that can be used in an equalizer-based timing recovery loop in accordance with an embodiment of the present disclosure.

As described in greater detail below, in some embodiments, Center of Filter (COF) can be used as a measure for a clock delay correction introduced during adaptive equalization. In some embodiments, the definition of Center of Filter (COF) is dependent on the type of the phase detector used in the timing recovery loop (as shown in FIG. 3). In the example described in detail herein, $$COF = \begin{cases} w_1 - w_{-1} & \text{PD Type } A \\ w_{-1} & \text{PD Type } B \end{cases} \quad \text{(Equation 1)}$$

where $w_1$ is the weight of the tap after the RefTap and $w_{-1}$ is the weight of the tap before the RefTap, the RefTap being the tap associated with the maximum of the absolute value of the tap. The COF can be calculated and saved into a register continuously following any change in the equalizer weights due to adaptation or COF compensation. It will be appreciated that the present disclosure is not limited to any specific definition of COF. Also, the definition of COF may vary with the particular configurations of the timing recovery loop and the components therein.

The EQ control logic 120 includes COF compensation logic 130 configured to adjust the taps weights and thereby control the clock phase correction based on the offset of the COF from the nominal COF which itself is dynamically updated according to embodiments of the present disclosure. The COF compensation logic 130 includes the COF_nom determination logic 131 for updating the nominal COF based on a form of error indicative of the sampling phase error as a result of the timing recovery process. In the illustrated example, the equalization error may be derived from the slicer error signal $e_k$ 105 or the BER 108 output from the FEC decoder 117. However, it will be appreciated that various other suitable signals, metrics or parameters can be used to indicate sampling phase error without departing from the scope of the present disclosure.

Figure 2:
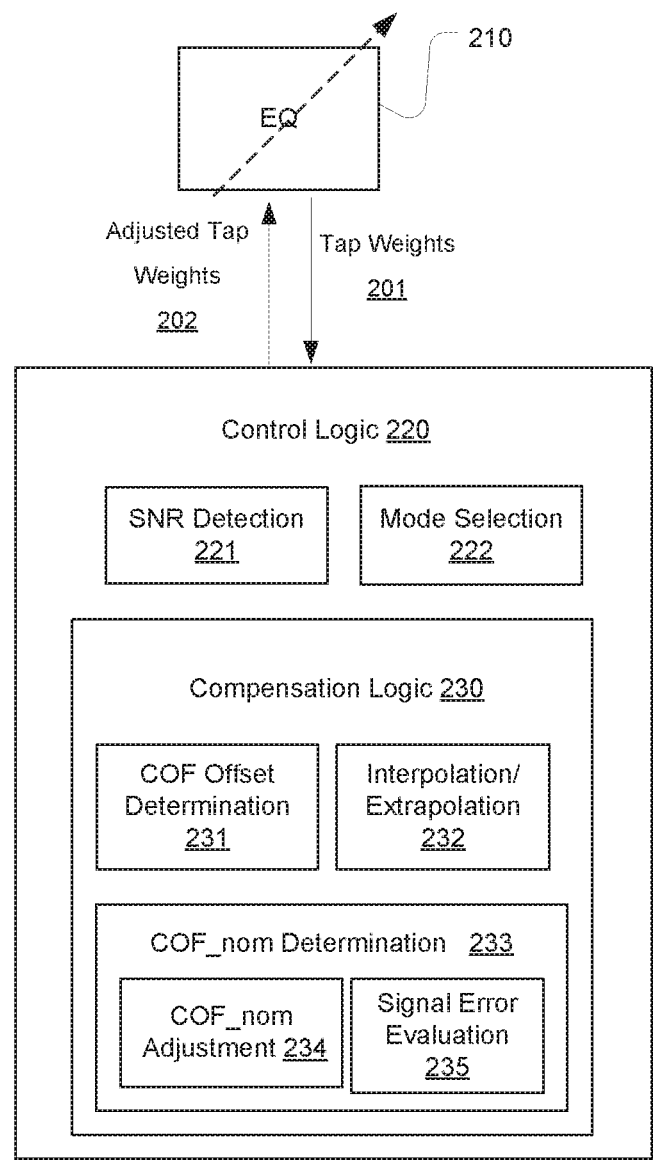
FIG. 2 illustrates the configuration of exemplary EQ control logic coupled to an adaptive equalizer and operable to detect and control clock delay correction introduced by the adaptive equalizer to facilitate sampling phase optimization according to an embodiment of the present disclosure.

FIG. 2 illustrates the configuration of exemplary EQ control logic 220 coupled to an adaptive equalizer 210 and operable to detect and control clock delay correction introduced by the adaptive equalizer 210 to facilitate sampling phase optimization according to an embodiment of the present disclosure. It will be appreciated that the present disclosure is not limited to any specific type of equalizer or any specific process or mechanism of adaptive equalization. The implementation of the equalizer is dependent on the adaptive process in the specific embodiment, such as an LMS adaptation process or any other method that is well-known in the art. In this example, the equalizer 210 includes a filter having multiple taps, for instance, an FIR filter with 8 taps. Controlled by the EQ control logic 210, the tap weights of the equalizer filter are adapted through an LMS adaptation process.

According to embodiments of the present disclosure, the EQ control logic 220 includes an SNR detection module 221, a mode selection module 222 and compensation logic 230. The compensation logic 230 is configured to detect in real time, and accordingly control the clock phase correction caused by the adaptive equalization process. In the illustrated example, the compensation logic 230 is equipped with the COF offset determination logic 231 for calculating COF offset based on the tap weights of the filter in the equalizer 210. COF offset corresponds to a difference between the current COF and a current COF_nom value which can be determined by the COF_Nom determination logic 233. The COF offset serves to indicate the amount and direction (positive or negative) of clock delay correction contributed by the adaptive equalization process. The COF_nom determination logic 233 uses the signal error evaluation logic 235 to evaluate detected sampling phase error, e.g., in real-time, and uses the COF_nom adjustment logic 234 to adjust the COF_nom to lead to minimized sampling phase error.

The interpolation/extrapolation logic 252 in the compensation logic 230 interpolates and/or extrapolates a set of selected tap weights to adjust another set of selected tap weights based on the COF offset, as described in greater detail below. The EQ control logic 220 may be implemented using logic circuitry, a programmable microcontroller, firmware, a combination thereof, or any other suitable means.

The mode selection logic 222 can select an operation mode of the equalizer 210 by selectively disabling or enabling its adaptation logic and the compensation logic 230. The operation mode can be selected based on the SNR as detected by the SNR detection logic 221. Various operational modes are described in greater detail below with reference to FIGS. 5-7.

During operation, the adjusted tap weights 202 are output from the control logic 220, supplied back to the equalizer 210 and used for equalization, leading to reduced COF offset and sampling phase error. As a result, clock delay correction introduced by adaptive equalization is controlled to reduce COF offset and the sampling phase error, and its interaction with the timing recovery loop can effectively and advantageously act to facilitate sampling phase optimization. Also, since the tap weights as adjusted based on the time delay correction that is dynamically calculated using COF offset as the metric, interference with the equalization adaptation caused by the tap weight adjustment is advantageously controlled to a minimal level.

FIG. 3 illustrates the configurations of exemplary phase detectors that can be used in an equalizer-based timing recovery loop in accordance with an embodiment of the present disclosure. The phase detectors can be used as the phase detector 114 in FIG. 1. A timing recovery loop may be equipped with or more types of phase detectors. Depending on the configuration of the phase detector that is enabled, the COF compensation logic may select the corresponding COF calculation. Diagram 310 shows the configuration of a "type A" phase detector based on the Mueller Muller (MM) algorithm. The (original) Mueller-Muller (MM) phase detector type A is given by:

$$x_k a_{k-1} - x_{k-1} a_k$$

where, for equalizer-based timing recovery, $x_k$ is the slicer input at the $k^{th}$ sample and $a_k$ is the slicer decision at the $k^{th}$ sample (as shown by 104 FIG. 1).

In an alternative implementation of MM type A, $$e_{k-1} \cdot (a_k - a_{k-2})$$

which is equivalent to:

$$e_{k-1} a_k - e_{k-1} a_{k-2}$$

$$-(e_{k-1} a_{k-2} - e_{k-1} a_k)$$

Since the loop averages the phase detector output, the index of the first term can be shifted by +1, which gives:

$$-(e_k a_{k-1} - e_{k-1} a_k)$$

This is equivalent to the original MM type A equation.

Diagram 320 shows the configuration of a "type B(1)" phase detector based on the Mueller Muller algorithm. Diagram 330 shows the configuration of a "type B(2)" phase detector based on the Mueller Muller algorithm. The MM phase detector type B(1) can be given by:

$$x_k a_{k-1}$$

In another version of Mueller-Muller PD type B, the slicer error, $e_k$, replaces the slicer input, $x_k$, which gives:

$$-e_k a_{k-1}.$$

The timing recovery loop zeros the post-cursor $w_1$ when MM Type B phase detector is used.

In type B(2) phase detector, the slicer error, $e_k$, replaces the slicer input, $-x_k$, giving:

$$-(e_k a_{k-1} - e_{k-1} a_k)$$

where the slicer error $e_k$ is given by $$e_k = a_k - x_k.$$

The two versions are equivalent because the mean of $a_k$ is zero.

In still another version of Mueller-Muller PD type B, the slicer error, $e_k$, replaces the slicer input, $x_k$, which gives $$e_{k-1} a_k.$$

Exemplary definitions of COF corresponding to these types of phase detectors are presented in Equation 1. Functions of these types of phase detectors are well known in the art and detailed description related thereto is omitted for brevity. It will be appreciated that any other suitable type of phase detector can also be used without departing the scope of the present disclosure. In such case, the definition of COF may change accordingly.

Figure 4:
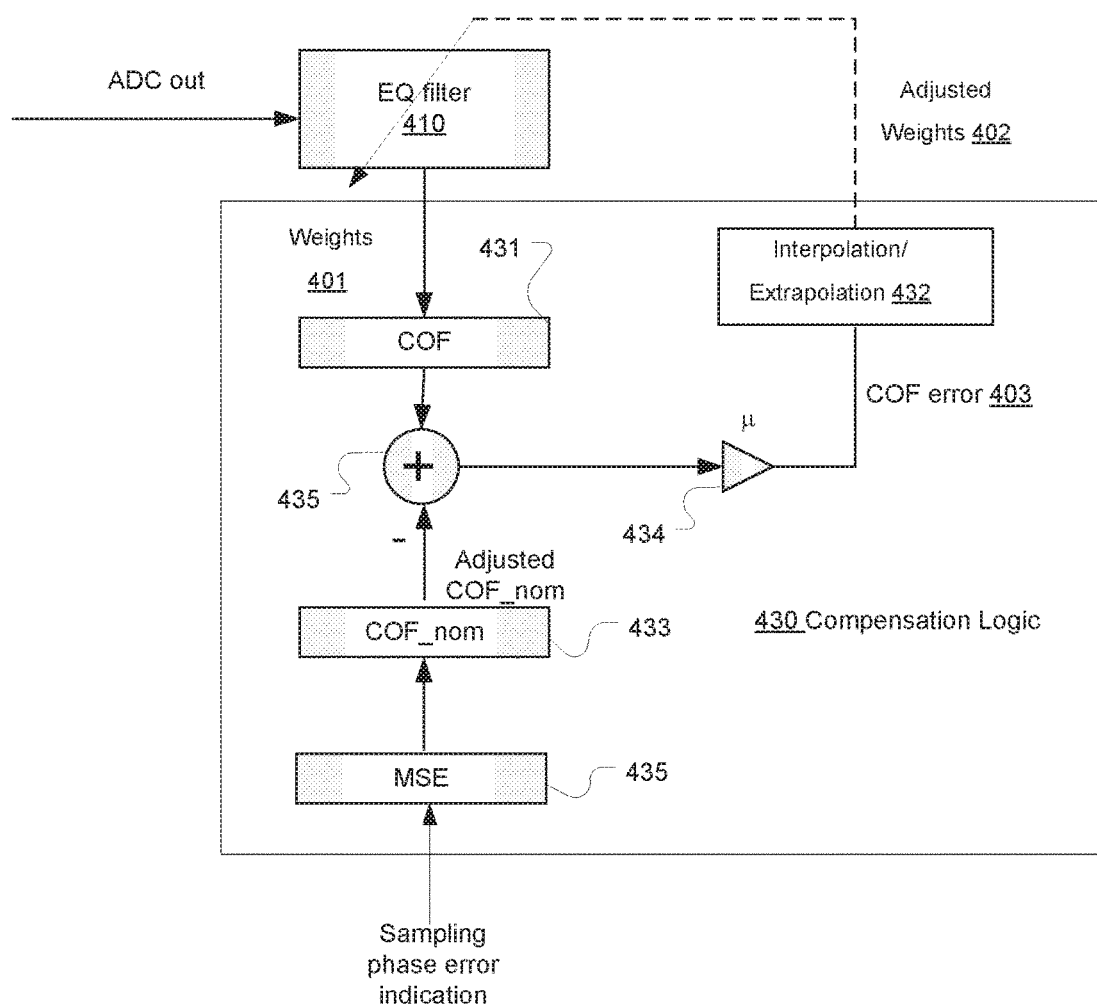
FIG. 4 illustrates the configuration of exemplary COF compensation logic coupled to the equalizer filter in accordance with an embodiment of the present disclosure.

FIG. 4 illustrates the configuration of exemplary COF compensation logic 430 coupled to the equalizer filter 410 in accordance with an embodiment of the present disclosure. The COF determination logic 431 can receive the tap weights 401 of the equalizer filter 410 and calculate the current COF value (or "the COF") of the equalizer filter 410, for example as defined in Equation 1. The COF is calculated and saved into a register continuously following any change of the tap weights due to adaptation or COF correction.

The COF compensation logic 430 further includes COF_nom determination logic 433 for generating and updating nominal COF (COF_nom) based on the output of a mean square error (MSE) logic 435, the COF determination logic 431 for computing the COF, an adder 435 for generating the COF offset, a multiplier 434 for multiplying the COF offset with a coefficient μ to generate the error 403, and the interpolation/extrapolation logic 432.

During operation, the COF_nom can be dynamically adjusted to achieve a minimized MSE 435 output. Concurrently, if the COF is shifted relative to current COF_nom, the COF can be corrected by modifying a set of selected taps of the equalizer filter, e.g., the main three taps. An alternative approach is to modify all the tap weights of the equalizer filter 410. Modification of the tap weights can be performed by interpolating/extrapolating the main three or five taps, or etc.

For example, if COF of the equalizer filter is shifted relative to the current COF_nom due to LMS, the COF is corrected by modifying the main two or one taps of the Equalizer. The updated two main weights are corrected by the error (e.g., the error 403 in FIG. 4):

$$e = \mu \cdot (COF - COF\_nom), \quad \text{(Equation 2)}$$

where the coefficient μ can depend on a programmable value n. For instance, μ can be defined as $$\mu = \begin{cases} 2^{-n}, & n = 0:30 \\ 0, & n = 31 \end{cases} \quad \text{(Equation 3)}$$

where the default can be set as n=4; and, when n=31, the COF correction is disabled.

COF correction can be implemented in various suitable methods. In a first exemplary method, the COF correction is performed via linear interpolation based on 3 (or 5) main taps. When 5 main taps are used, a linear interpolation is applied to get the 3 corrected main taps. When 3 main taps are used, an interpolation or extrapolation is used to get the corrected 3 main taps.

To simplify the implementation, the difference ΔCOF=COF−COF_nom can be approximated, so the implementation can use a shifter instead of a multiplier. For example, it can be approximated as:

$$\Delta COF \approx \text{sign}(\Delta COF) \cdot 2^{rnd(log2(abs(\Delta COF)))}$$

where "rnd" represent round, and "abs" represents absolute value. When ΔCOF=0, set e=0.

Corrections of the two main taps (before and after the RefTap) based on 3 tap weights can be given by:

$$y_1 = (w_1 - w_0) \cdot e + w_1$$

$$y_{-1} = (w_0 - w_{-1}) \cdot e + w_{-1}$$

where the 3 old main weights are $w_{-1}, w_0, w_1$, and the new 3 weights are $y_{-1}, y_0, y_1$ In this example, the weight of the RefTap is not corrected.

However, in an alternative embodiment, the RefTap can be corrected in combination with correction of the other two main taps as shown above. The RefTap correction can be represented as:

$$y_0 = (w_1 - w_0) \cdot e + w_0, e \geq 0$$

$$y_0 = (w_0 - w_{-1}) \cdot e + w_0, e < 0$$

In a second exemplary method, the correction of the main 3 taps is based on 5 tap weights. For example, the new 3 main weights $y_i$, $i=-1,0,+1$, can be given by:

$$y_i=(w_{i+1}-w_i)\cdot e+w_i, e\geq 0, i=-1,0,+1$$

$$y_i=(w_i-w_{i-1})\cdot e+w_i, e<0, i=-1,0,+1$$

That is, $$y_0=(w_1-w_0)\cdot e+w_0, e\geq 0$$

$$y_0=(w_0-w_{-1})\cdot e+w_0, e<0$$

$$y_1=(w_2-w_1)\cdot e+w_1, e\geq 0$$

$$y_1=(w_1-w_0)\cdot e+w_1, e<0$$

$$y_{-1}=(w_0-w_{-1})\cdot e+w_{-1}, e\geq 0$$

$$y_{-1}=(w_{-1}-w_{-2})\cdot e+w_{-1}, e<0$$

In a third exemplary method, the two main weights $w_1$ and $w_{-1}$ are adjusted alternately in consecutive cycles. For example, $$w_1=w_1-e$$

$$w_{-1}=w_{-1}+e$$

The duration of the alternation can be set by a counter. For instance, the default value of the duration is set as 1, and the correction sequence is: $w_1$, $w_{-1}$, $w_1$, $w_{-1}$, ..., etc. A "STATE" register can be used and toggle between 0 and 1 after the counter reaches its end. When STATE=0, $w_{-1}$ is updated, and when STATE=1, $w_1$ is updated.

A programmable register "COF_TAP_CORRECTION" may be used, in combination with the STATE register, to control which taps are corrected based on COF offset. For instance, the values of the COF_TAP_CORRECTION can be defined as follows:

$$COF\_TAP\_CORRECTION = \begin{cases} 00, & \text{Corrects} & \text{none} \\ 01, & \text{Corrects} & w_1 \\ 10, & \text{Corrects} & w_{-1} \\ 11, & \text{Corrects} & w_{-1} \& w_1 (\text{default}) \end{cases}$$

Although embodiments of the present disclosure described herein use linear interpolation/extrapolation, various other suitable techniques, mechanisms, algorithms and methods that are well known in the art can be used to modify the tap weights for COF correction purposes. For example, exponential or parabola interpolation can be used instead. Further, the tap weights or other type of coefficients of an equalization filter can be updated for purposes of COF correction in any other suitable method or algorithm that is well known in the art.

The RefTap location refers to the tap index of the main tap that has the maximum absolute tap weight. When the tap weights are updated due to adaptation or COF correction, the RefTap may change to another location (a different tap index). In some embodiments, once the location of a RefTap is changed as a result of updating the tap weights (e.g., the main three taps), the updated tap weights are discarded and the previous values of these tap weights are loaded back.

A variety of techniques, processes, methods and algorithms can be used to acquire an initial COF_nom without departing from the scope of the present disclosure. In one embodiment, an initial COF_nom can be user-assigned based on the expected channel characteristics. In some other embodiments, an initial COF_nom can be obtained through programmed tryouts using a number of candidate initial COF_nom values. The candidate value that yields an optimal performance can be selected as the initial COF_nom used for subsequent signal processing.

In still some other embodiments, the initial nominal COF of the equalizer is obtained after a successful timing recovery acquisition where the equalizer SNR is above a programmable threshold, or the equalizer noise is below a programmable threshold. The equalizer noise can be obtained via averaging of a squared slicer error for example.

In an acquisition state, the timing recovery loop runs for a programmable number of symbols. The programmable number is stored in a register and used to define the duration of the acquisition process. The mean squared error or the SNR of the equalizer signal, the mean squared error of the equalized signal and the initial COF values are saved, while the tap weights updating based on computed COF offset is disabled. In the acquisition state, a sampling phase optimization process can be performed to search for a best COF_nom that leads to the smallest sampling phase error. In the tracking state, the tap weights are updated based on the computed COF offset, when the COF_nom can continued to be updated based on the detected sampling phase error in real time. The correction of COF_nom may be smaller in the tracking state than the acquisition state.

A timing recovery loop according to the present disclosure can operate in various optional modes depending on whether COF compensation and equalization adaptation are enabled. In each mode, the timing recovery loop may operate in one of the two states: acquisition and tracking.

In the acquisition state, the timing recovery loop runs for a programmable number of symbols set by a register ("acquisition_duration" register). The mean squared error of the equalized signal and COF values are saved at the end of the acquisition state. Alternatively, the acquisition state is not controlled by the acquisition duration register, but rather by the firmware. In the tracking state, the timing recovery process runs continuously.

Figure 5:
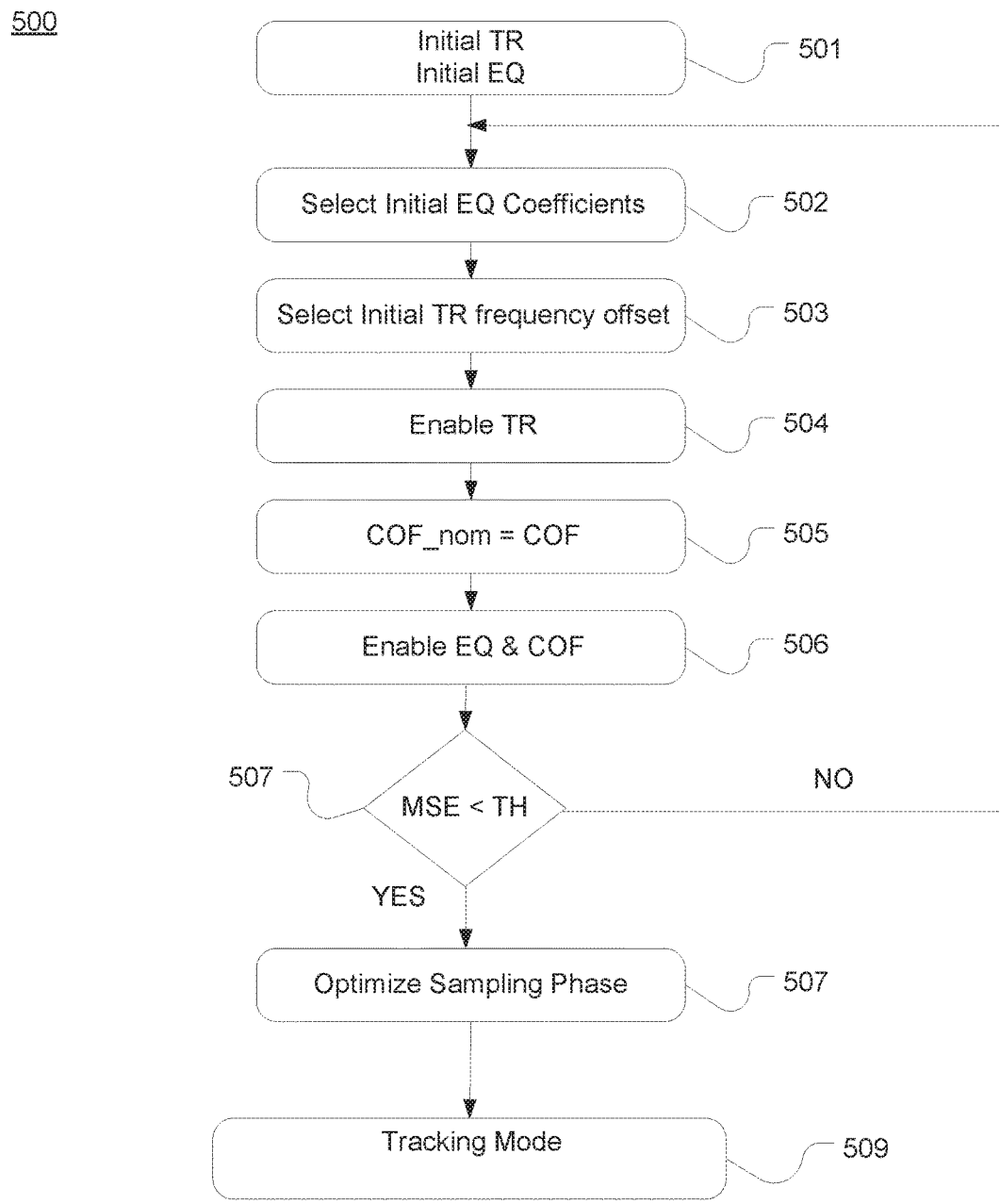
FIG. 5 is a flow chart depicting an exemplary timing recovery process with COF compensation and COF_nom adaptation both enabled according to an embodiment of the present disclosure.

FIG. 5 is a flow chart depicting an exemplary timing recovery process 500 with COF compensation and COF_nom adaptation both enabled according to an embodiment of the present disclosure. At 501 a timing recovery (TR) loop and equalization (EQ) process are initialized. At 502, a set of initial equalizer coefficients are selected from a tryout list and loaded into the equalizer. At 503, an initial timing recovery frequency offset is selected, e.g., from a tryout list, and loaded into the timing recovery loop filter register that holds the frequency offset estimate At 504, the timing recovery process is activated. At 505, COF is obtained from the equalizer coefficient and loaded onto the COF_nom register. At 506, equalization and COF computation are enabled, where the equalization taps are adapted based on the detected COF offset from the nominal COF. During the course, the equalizer means square error (MSE) is computed and monitored as an indication of sampling phase error of the timing recovery loop. At 507, if it is determined that MSE is greater than a programmable threshold (TH), the forgoing 502-507 is repeated with different initial equalizer coefficients and/or frequency offset from tryout lists.

On the other hand, if the MSE exceeds the threshold (at 507), the sampling phase optimization is performed at 508 as part of the acquisition stage by finding the COF_nom as described in greater detail with reference to FIG. 6. After 508, the timing recovery proceeds to a tracking mode at 509, in which the equalizer taps continue to adapt and track any variations in the channel. Also the timing recovery loop continues to track the sampling phase variations due to jitter for example. The adaptation of the equalizer FFE has the constraints of the COF that ensures that the COF of the FFE equals the COF_nom value to prevent undesirable interaction between equalization and timing recovery.

Figure 6:
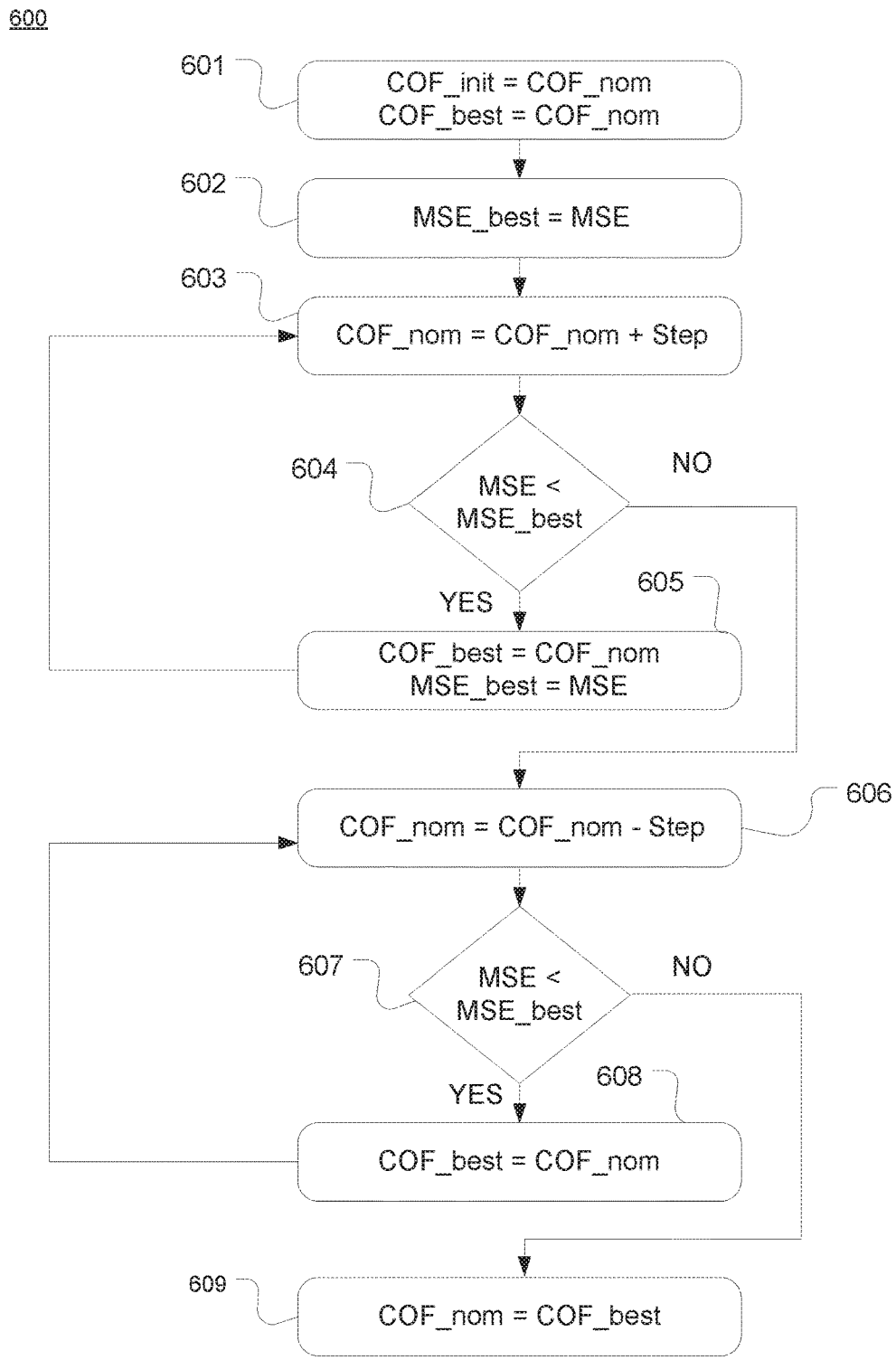
FIG. 6 is a flow chart depicting an exemplary process of sampling phase optimization by using COF_nom adaptation according to an embodiment of the present disclosure.

FIG. 6 is a flow chart depicting an exemplary process of sampling phase optimization by COF_nom adaptation according to an embodiment of the present disclosure. An optimal sampling phase is searched by searching a best value of COF_nom. The searching can be implemented as incrementing the COF_nom step by step until the MSE starts to increase, then decrementing the COF_nom step by step until the MSE starts to increase again. The step or steps are programmable. However, this is merely exemplary, COF_nom can be updated based on a sampling phase error indication in any other suitable manner without departing from the scope of the present disclosure.

More specifically, at 601, the initial COF (COF_init) is set as the COF_nom value and the COF_nom value is assigned to the variable COF_best. At 602, the equalizer MSE is determined and assigned to the variable MSE_best. At 603, the COF_nom increments by one step, represented as COF_nom=COF_nom+Step. The equalizer is then given some time to adapt, which results in an updated MSE. At 604, the MSE resulting from the incremented COF is determined and compared with the previous MSE which is stored as MSE_best. If MSE is better than (smaller than) the previous MSE (MSE<MSE_best), at 605, the incremented COF_nom is assigned to COF_best, and the MSE_best is updated with the current MSE. Steps 603~605 are repeated to continue to increment MSE by steps until the MSE starts to increase as determined at 604.

Next, if the MSE starts to become larger, the COF_nom is decremented by steps until the MSE stops becoming smaller. More specifically, the COF_nom is decremented by a step at 606 (COF_nom=COF_nom-Step) and the resultant MSE is compared with the previous MSE (MSE_best) at 607. If MSE is better than (smaller than) the previous MSE (MSE<MSE_best), at 608, the decremented COF_nom is assigned to "COF_best," and the "MSE_best" is updated with the current MSE (MSE_best=MSE). Steps 606~608 are repeated to continue to decrement COF_nom by steps until the MSE starts to increase as determined at 607. However, if MSE starts to become worse than (larger than) the previous MSE (MSE<MSE_best), COF_nom is set as the last best COF_nom value (COF_best) at 609.

Process 600 can be performed in the sampling phase optimization in the acquisition mode (step 508) as well as in the tracking mode (step 509 in FIG. 5). Once an optimal sampling phase is obtained in the acquisition state, sampling phase error in the tracking state is usually relatively small and may be caused by temperature change of the analog and digital components in the receiver over time. Thus, in some embodiments, a smaller step for varying COF_nom can be used in the tracking mode than the sampling phase optimization mode.

Figure 7:
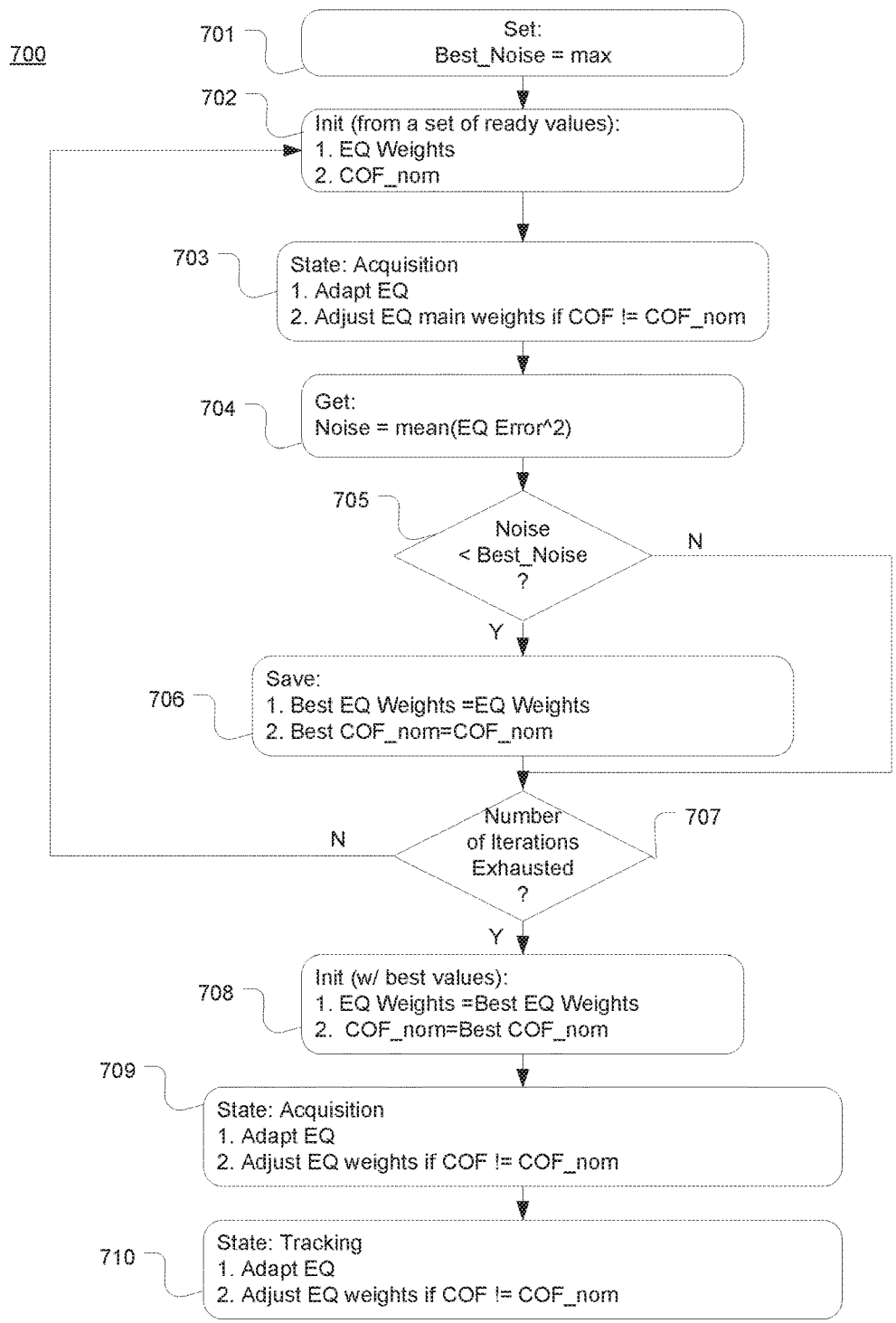
FIG. 7 is a flow chart of pseudo code for an exemplary equalization process with both equalization adaptation and COF correction enabled according to an embodiment of the present disclosure.

FIG. 7 is a flow chart of pseudo code for an exemplary equalization process 700 with both equalization adaptation and COF correction enabled according to an embodiment of the present disclosure. For instance, the two main taps before and after RefTap are adapted during both the acquisition and tracking states. The COF is constantly modified, and the COF correction tries to correct the COF to keep it close to COF_nom which is updated according to process 600 shown in FIG. 6. Process 700 may be performed by the EQ control logic in FIGS. 1, 2 and 4 for example.

In the acquisition state, the tap weights and COF_nom of the equalizer filter are initialized. While applying equalization adaptation, the weights of the two main taps are corrected so the COF is kept close to COF_nom. After acquisition, if the SNR is below a programmable threshold, another set of tap weights of the equalizer and COF_nom are initialized and the timing recovery loop is restarted until the SNR is above a certain threshold. An alternative approach is to select the best set of initial tap weights of the equalizer and COF_nom that achieved the maximum SNR between couples of tryouts.

More specifically, at 701, a noise threshold (Best_Noise) is set as "max." At 702, the tap weights and COF_nom are initialized using a set of ready values. At 703, the acquisition state is configured such that the equalizer is dynamically adaptive to the channel characteristics and continuously adjusted to compensate for the COF offset. In addition, the COF_nom is dynamically adaptive to the sampling phase error, e.g., as derived from the slicer error or the BER resulting from FEC.

At 704, the equalizer error is averaged and saved as "Noise." At 705, it is determined if Noise is less than Best_Noise. If yes, the instant tap weights of the equalizer filter are saved as the "Best EQ Weights," and the instant COF_nom is assigned to "Best COF_nom" at 706. It is checked at 707 whether the number of iterations has been exhausted. If not, the foregoing 702-707 are repeated to obtain a set of weights that lead to a satisfactory noise level of the equalizer.

If the number of iterations has been exhausted, the EQ Weights and the COF_nom are assigned with Best EQ Weights and the best COF_nom respectively at 708. In subsequent equalization process, both the acquisition state 709 and the tracking state 710, the tap weights of the equalizer filter are adapted to current channel characteristics. Also, the weights are adjusted based on the nominal COF value.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of timing recovery for signals received via serial links, said method comprising:
  applying an equalizer filter to generate an equalized signal responsive to a digital input signal and based on a set of equalizer parameters;
  performing a timing recovery process on said equalized signal;
  generating an indication of sampling phase error resulting from said timing recovery process;
  determining a center of filter (COF) of said equalizer filter, wherein said COF is determined based on a function of a first set of selected equalizer parameters of said set of equalizer parameters;
  determining a nominal COF representing a nominal value of said function of said first set of selected equalizer parameters, wherein said nominal COF is determined based on said indication of sampling phase error;
  determining an offset between said COF with said nominal COF; and adjusting said set of equalizer parameters based on said offset.

2. The method of claim 1, wherein said offset indicates a correction in clock delay resulting from generating said equalized signal.

3. The method of claim 1, wherein said equalization filter comprises a plurality of taps, and wherein said adjusting said set of equalizer parameters comprises adjusting tap weights of said equalization filter.

4. The method of claim 1 further comprising demodulating said equalized signal by using a slicer, wherein said indication of sampling phase error corresponds to an error signal between an output signal from said slicer and an input signal to said slicer.

5. The method of claim 1, wherein said indication of sampling phase error corresponds to a bit error rate (BER) of said equalized signal.

6. The method of claim 4, wherein said determining said nominal COF comprises:
deriving a mean squared error of said error signal; and
adjusting said nominal COF until a minimum value of said mean square error is obtained, wherein said adjusting said nominal COF comprises incrementing and decrementing said nominal COF by steps.

7. The method of claim 3, wherein said COF corresponds to one of: a tap weight difference between two selected taps of said equalization filter; and a tap weight of a selected tap of said equalization filter.

8. The method of claim 3, wherein said adjusting said tap weights comprises updating tap weights of a second set of selected taps in said equalization filter based on said offset and further based on interpolating/extrapolating tap weights of a third set of selected taps in said equalization filter.

9. The method of claim 8, wherein said second set of selected taps comprise one or more of a reference tap, a tap before said reference tap and a tap after said reference tap, and wherein said third set of selected taps comprise said reference tap, two taps before said reference tap and two taps after said reference tap.

10. The method of claim 7, and wherein said adjusting said tap weights comprises alternately updating two selected tap weights of said equalization filter.

11. A device for signal processing, said device comprising:
an equalizer configured to generate an equalized signal responsive to a digital input signal, wherein said equalizer comprises an equalization filter comprising a set of taps;
a timing recovery module configured to perform timing recovery process on said equalized signal; and
equalizer control logic coupled to said equalizer and configured to:
generate an indication of sampling phase error resulting from said timing recovery process;
determine a center of filter (COF) of said equalizer filter, wherein said COF is determined based on a function of a first set of selected taps of said set of equalizer taps;
determine a nominal COF representing a nominal value of said function of said first set of selected taps, wherein said nominal COF is determined based on said indication of sampling phase error;
determine an offset between said COF with said nominal COF; and
adjust said set of equalizer taps based on said offset.

12. The device of claim 11 further comprising a slicer coupled to an output of said equalizer, wherein said indication of sampling phase error corresponds to an error signal between an output signal from said slicer and an input signal to said slicer.

13. The device of claim 11 further comprising a Forward Error Correction (FEC) decoder coupled to an output of said equalizer, wherein said indication of sampling phase error corresponds to a bit error rate (BER) output from said FEC decoder.

14. The device of claim 12, wherein said equalization control logic is configured to determine said nominal COF by performing:
deriving a mean squared error of said error signal; and
adjusting said nominal COF until a minimum value of said mean square error is obtained, wherein said adjusting said nominal COF comprises incrementing and decrementing said nominal COF by steps.

15. The device of claim 11, wherein said COF corresponds to one of: a tap weight difference between two selected taps of said equalization filter; and a tap weight of a selected tap of said equalization filter.

16. The device of claim 11, wherein said equalization control logic is configured to adjust said tap weights by updating tap weights of a second set of selected taps in said equalization filter based on said offset and further based on interpolating/extrapolating tap weights of a third set of selected taps in said equalization filter.

17. The device of claim 16, wherein said second set of selected taps comprise one or more of a reference tap, a tap before said reference tap and a tap after said reference tap, and wherein said third set of selected taps comprise said reference tap, two taps before said reference tap and two taps after said reference tap.

18. The device of claim 11, wherein said equalization control logic is configured to adjust said tap weights by alternately updating two selected tap weights of said equalization filter.

19. A receiver comprising:
an analog-to-digital converter (ADC) configured to generate a digital input signal responsive to a received signal and based on a clock signal;
an equalizer coupled to an output of said ADC and configured to generate an equalized signal responsive to a digital input signal, wherein said equalizer comprises an equalization filter comprising a set of taps;
a timing recovery module configured to perform timing recovery process on said equalized signal and generate said clock signal;
equalizer control logic coupled to said equalizer and configured to:
generate an indication of sampling phase error resulting from said timing recovery process;
determine a center of filter (COF) of said equalizer filter, wherein said COF is determined based on a function of a first set of selected taps of said set of equalizer taps;
determine a nominal COF representing a nominal value of said function of said first set of selected taps, wherein said nominal COF is determined based on said indication of sampling phase error;
determine an offset between said COF with said nominal COF; and
adjust said set of equalizer taps based on said offset.

20. The receiver of claim 19 further comprising a slicer and a Forward Error Correction (FEC) decoder coupled to an output of said equalizer, wherein said indication of sampling phase error corresponds to: an error signal between an output signal from said slicer and an input signal to said slicer; or a bit error rate (BER) output from said FEC decoder.

21. The receiver of claim 19, wherein said equalization control logic is configured to determine said nominal COF by performing:
   deriving a mean squared error of said error signal; and
   adjusting said nominal COF until a minimum value of said mean square error is obtained, wherein said adjusting said nominal COF comprises incrementing and decrementing said nominal COF by steps.

22. The receiver of claim 19, wherein said COF corresponds to one of: a tap weight difference between two selected taps of said equalization filter; and a tap weight of a selected tap of said equalization filter.

* * * * *